United States Patent
Oakeson et al.

(10) Patent No.: US 7,187,462 B2
(45) Date of Patent: Mar. 6, 2007

(54) PROXIMITY-BASED PRINT QUEUE ADJUSTMENT

(75) Inventors: Kenneth Lee Oakeson, Boise, ID (US); Shell Sterling Simpson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 917 days.

(21) Appl. No.: 10/188,431

(22) Filed: Jul. 3, 2002

(65) Prior Publication Data

US 2004/0004735 A1    Jan. 8, 2004

(51) Int. Cl.
*G06F 3/12* (2006.01)
*G06K 15/00* (2006.01)

(52) U.S. Cl. .................................. 358/1.15; 358/1.14

(58) Field of Classification Search ......... 358/1.1–1.18
See application file for complete search history.

(56) References Cited

U.S. PATENT DOCUMENTS

| | | | |
|---|---|---|---|
| 6,288,790 B1* | 9/2001 | Yellepeddy et al. | ....... 358/1.15 |
| 2003/0142353 A1* | 7/2003 | Allen et al. | |
| 2004/0004559 A1* | 1/2004 | Rast | |
| 2004/0226993 A1* | 11/2004 | Fulcher et al. | |

* cited by examiner

*Primary Examiner*—Douglas Q. Tran

(57) ABSTRACT

Systems and methods for adjusting print queues to obtain more efficient printing are disclosed. In one embodiment, a system and method for adjusting a print queue pertain to detecting proximity of a user to the printing device, determining if the user has any outstanding print jobs, and adjusting a print queue for the printing device if it is determined that the user does have an outstanding print job. By way of example, adjusting the queue can include one or more of interrupting a current print job so that the user's print job can be printed, elevating the user's print job in the order of the queue, and adding the user's print job from another queue to the queue for the printing device.

32 Claims, 8 Drawing Sheets

PROXIMITY-BASED PRINT QUEUE ADJUSTMENT

FIELD OF THE INVENTION

The present disclosure relates to printing. More particularly, the disclosure relates to proximity-based print queue adjustment.

BACKGROUND OF THE INVENTION

Printing devices are often connected to local area networks (LANs) so that they can be shared by several different users. Such an arrangement normally works well, especially where there are only a few users that rely upon the printing device and/or users typically do not send a large number of print jobs to the printing device at a given time. Such shared device arrangements can be problematic, however, where a large volume of print jobs are sent to the printing device, as is likely when many different users all rely upon the same printing device.

In the latter situation, users often arrive at a given printing device after sending a print job to it only to find that other print jobs are currently printing. Where one or more of these other print jobs is very large, e.g., a user manual for an electronic device, the user may realize with frustration that his or her print job will not likely print for a relatively long period of time. Such a scenario can be particularly irksome, or even damaging, to the user where the user must obtain a hardcopy of the document as soon as possible (e.g., before an important meeting).

Although there are existing solutions to the aforementioned problem, none is particularly appealing. One such solution is to search for an alternative printing device that is not currently occupied with printing other print jobs. This solution, however, requires that there is in fact another printing device available on the network and available to the user (i.e., the user has an appropriate driver in place for that printing device). If there is such a printing device available, the user may then waste valuable time in physically travelling to the different locations at which the printing devices are located and determining their availability.

In another solution, the user can request that a network administrator, or other person with the required authority, to adjust the print queue for the printing device to elevate the user's print job up in the order of the queue. Although such action could reduce the waiting time for the user, it normally is ineffective where the current job is very large in that the current job normally cannot be placed on hold by the administrator or other person. Even if this is not the case, the user must locate the administrator or other person before queue adjustment can be achieved.

In yet another solution, the user can merely cancel the current print job, or any other print job before the user's in the queue, by selecting a "cancel" button on the printing device. Although this solution is normally quick and effective, it typically results in other persons' jobs not being completed in that such an action actually cancels the job(s) instead of merely delaying printing of the job(s).

In view of the above, it can be appreciated that it would be desirable to be able to adjust the order of a print queue to obtain certain print jobs more quickly that avoids one or more of the drawbacks identified above.

SUMMARY OF THE INVENTION

The present disclosure relates to adjusting print queues to obtain more efficient printing. In one embodiment, a system and method for adjusting a print queue pertain to detecting proximity of a user to the printing device, determining if the user has any outstanding print jobs, and adjusting a print queue for the printing device if it is determined that the user does have an outstanding print job. By way of example, adjusting the queue can include one or more of interrupting a current print job so that the user's print job can be printed, elevating the user's print job in the order of the queue, and adding the user's print job from another queue to the queue for the printing device.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
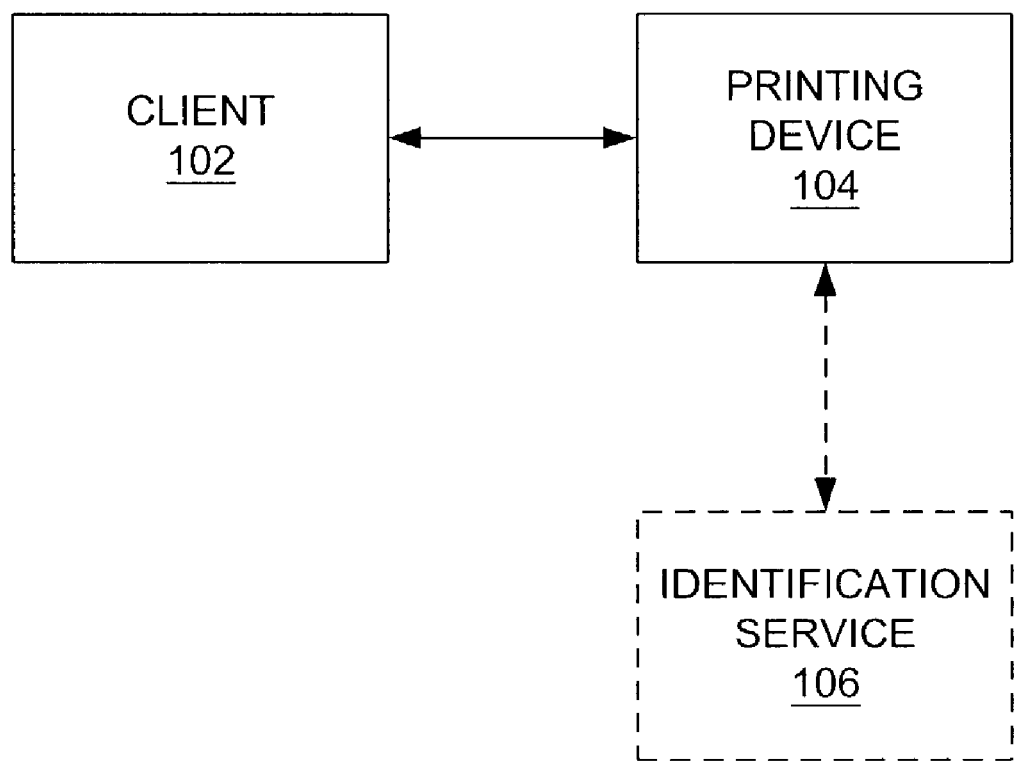
FIG. 1 is a block diagram of an example system that facilitates print queue adjustment.

Referring now in more detail to the drawings, in which like numerals indicate corresponding parts throughout the several views, FIG. 1 illustrates a generalized system 100 for facilitating print queue adjustment that can be used to obtain a given print job more quickly. As indicated in this figure, the system 100 generally comprises a client 102 and a printing device 104 to which the client may have sent a print job. The client 102 can comprise a user and/or a client device that is configured to communicate with the printing device 104 in some manner.

During operation of the system 100, the client 102 (i.e., a user or a client device) communicates with the printing device 104 such that the printing device can detect the presence (i.e., proximity) of the user. Once the user's presence is detected, the user's identity can be determined by the printing device 104, or by an identification service 106 that is accessible to the printing device, so that it can be determined whether the user has an outstanding print job and, if so, whether print queue adjustment, such as elevating the user's print job in the order of the queue, is warranted.

With the mode of operation summarized above, the client 102 can, if desired, decrease the time he or she must wait before his or her print job is output by the printing device 104. Therefore, priority can, optionally, be provided to print jobs of the persons that are proximate the printing device, thereby indicating a potential desire or need for of receiving the print job sooner.

Figure 2:
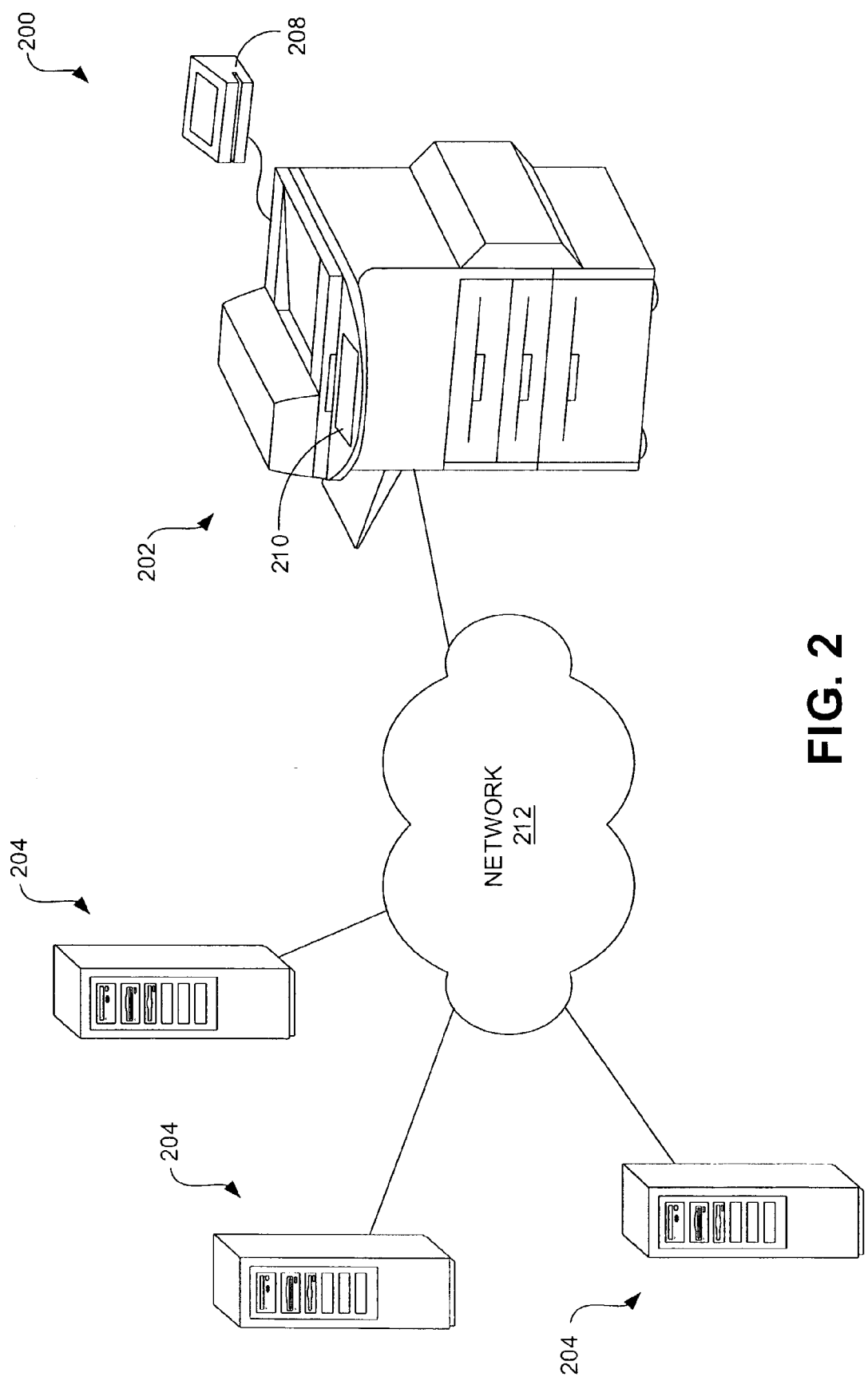
FIG. 2 is a schematic view of a network-based system in which print queue adjustment can be facilitated.

Referring next to FIG. 2, illustrated is an example network-based system 200 that can facilitate print queue adjustment in the manner described in relation to FIG. 1. As indicated in FIG. 2, the system 200 generally comprises a printing device 202 and one or more computing devices 204. Generally speaking, the printing device 202 comprises any network-enabled imaging device that is capable of generating hardcopy documents. Accordingly, the printing device 202 can comprise a printer, a multifunction peripheral (MFP), an all-in-one device, etc. As indicated in FIG. 2, the printing device 202 typically comprises at least one client communication device that can be used to detect the proximity of a user as well as facilitate user identification. By way of example, the communication device can comprise an auxiliary device, such as device 208, or a integral device that comprises part of the printing device control panel 210, such as a keyboard, a keypad, or a touch-sensitive screen.

The computing devices 204 can comprise any network-enabled device that stores one or more programs and data. By way of example, the computing devices 204 comprise a mainframe computer, a server computer, a personal computer (PC), etc.

As is further identified in FIG. 2, the printing device 202 and computing devices 204 are connected to a network 212. The network 212 typically comprises one or more sub-networks that are communicatively coupled to each other. By way of example, these networks include one or more local area networks (LANs) and/or wide area networks (WANs). Indeed, in some embodiments, the network 212 may comprise a set of networks that forms part of the Internet. Optionally, one or more of the computing devices 204 can be directly connected to the printing device 202 (not shown), if desired.

Figure 3:
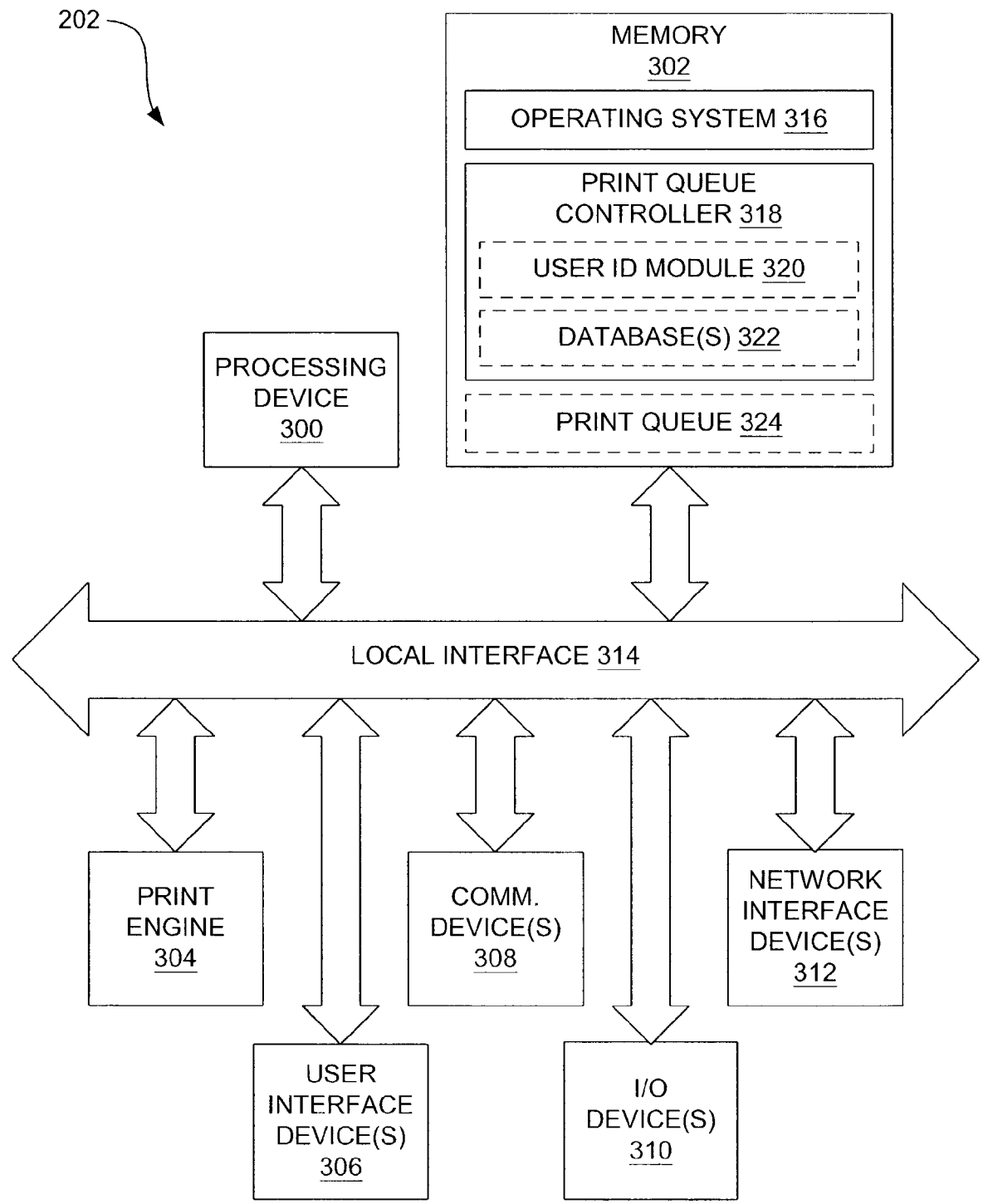
FIG. 3 is a block diagram of an example configuration for a printing device shown in FIG. 2.

FIG. 3 is a block diagram of an example configuration for the printing device 202 shown in FIG. 2. As indicated in FIG. 3, the printing device 202 can, for instance, comprise a processing device 300, memory 302, a print engine 304, one or more user interface devices 306, one or more client communication devices 308, one or more input/output (I/O) devices 310, and one or more network interface devices 312. Each of these components is connected to a local interface 314 that, by way of example, comprises one or more internal buses. The processing device 300 is adapted to execute commands stored in memory 302 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the printing device 202. The memory 302 can include any one of a combination of volatile memory elements (e.g., random access memory (RAM, such as DRAM, SRAM, etc.)) and nonvolatile memory elements (e.g., ROM, hard drive, tape, CDROM, etc.).

The print engine 304 comprises the various components with which the printing device 202 generates hardcopy documents. Accordingly, the print engine 304 can comprise, for instance, a print medium drive mechanism, a photoconductor drum, a developing roller, fusing system, etc.

The one or more user interface devices 306 comprise interface tools with which the device settings can be changed and through which the user can communicate commands directly to the printing device 202. These devices 306 typically comprise a plurality of keys (e.g., of a keyboard or keypad) that are used to enter alphanumeric characters, and/or a touch-sensitive screen (e.g., liquid crystal display) that is used to enter characters. In the latter case, the touch-sensitive screen may present various "soft" keys to form a virtual keyboard or keypad with which information can be entered.

The one or more client communication devices 308 comprise a device that can be used by the printing device 202 to detect the user's proximity and facilitate identification of the user. Such a communication device can comprise a device that requires little or no user involvement (i.e., user detected without some affirmative action taken), or a device that requires user involvement. In the former case, the communication device can comprise, for example, a radio frequency (RF) transceiver that is adapted to detect proximity of an RF identification (RFID) component, such as an RFID card that is worn or carried on the user's person. In the latter case, the communication device can comprise, for example, a scanning device (e.g., card reader) that is configured to read one of a magnetic strip, barcode, two-dimensional (e.g., dot pattern) code, written text (i.e., through optical character recognition (OCR)); a biometric recognition device that is configured to recognize biometric parameters of the user such as a thumb or finger print, retina pattern, etc.; a voice recognition component that is configured to recognize the user's voice; a keyboard or keypad (either part of or separate from the user interface devices 306 identified above) with which a user can enter a number or password; and the like. As will be appreciated from the discussions that follow, the particular configuration of the client communications devices 308, and therefore the manner in which the user is detected and/or identified, is not critical to the achievement of print queue adjustment.

The one or more I/O devices 310 comprise components used to facilitate connection of the printing device 202 to other devices. These I/O devices 310 can, for instance, comprise one or more serial, parallel, small system interface (SCSI), universal serial bus (USB), IEEE 1394 (e.g., Firewire™), or personal area network (PAN) connection devices. The network interface devices 312 comprise the various components used to transmit and/or receive data over the network 212. By way of example, the network interface devices 312 include a device that can communicate both inputs and outputs, for instance, a network card, modulator/demodulator (e.g., modem), a radio frequency (RF) or other transceiver, a telephonic interface, a bridge, a router, etc.

The memory 302 includes various code (software and/or firmware) including an operating system 316 and a print queue controller 318. The operating system 316 contains the various commands used to control the general operation of the printing device 202. The print queue controller 318 comprises the various commands used to determine when the order within the print queue 324 is to be adjusted and facilitates such adjustment where appropriate. As indicated in FIG. 3, the print queue controller 318 can comprise a user identification module 320 with which the identity of a user can be determined, typically with reference to one or more databases 322 maintained by the controller. As is discussed below, part or all of the print queue controller 318 may reside on another device, e.g., a computing device 204, where the printing device 202 has limited storage and/or computing capacity. In such a case, the services provided by the various remote controller components may be accessed by the printing device 202, for instance via the network 212. In addition, the print queue 324 could optionally, be located remotely, again, for example, within a computing device 204. An example of operation of the print queue controller 318 is provided below with reference to FIGS. 6A and 6B.

Figure 4:
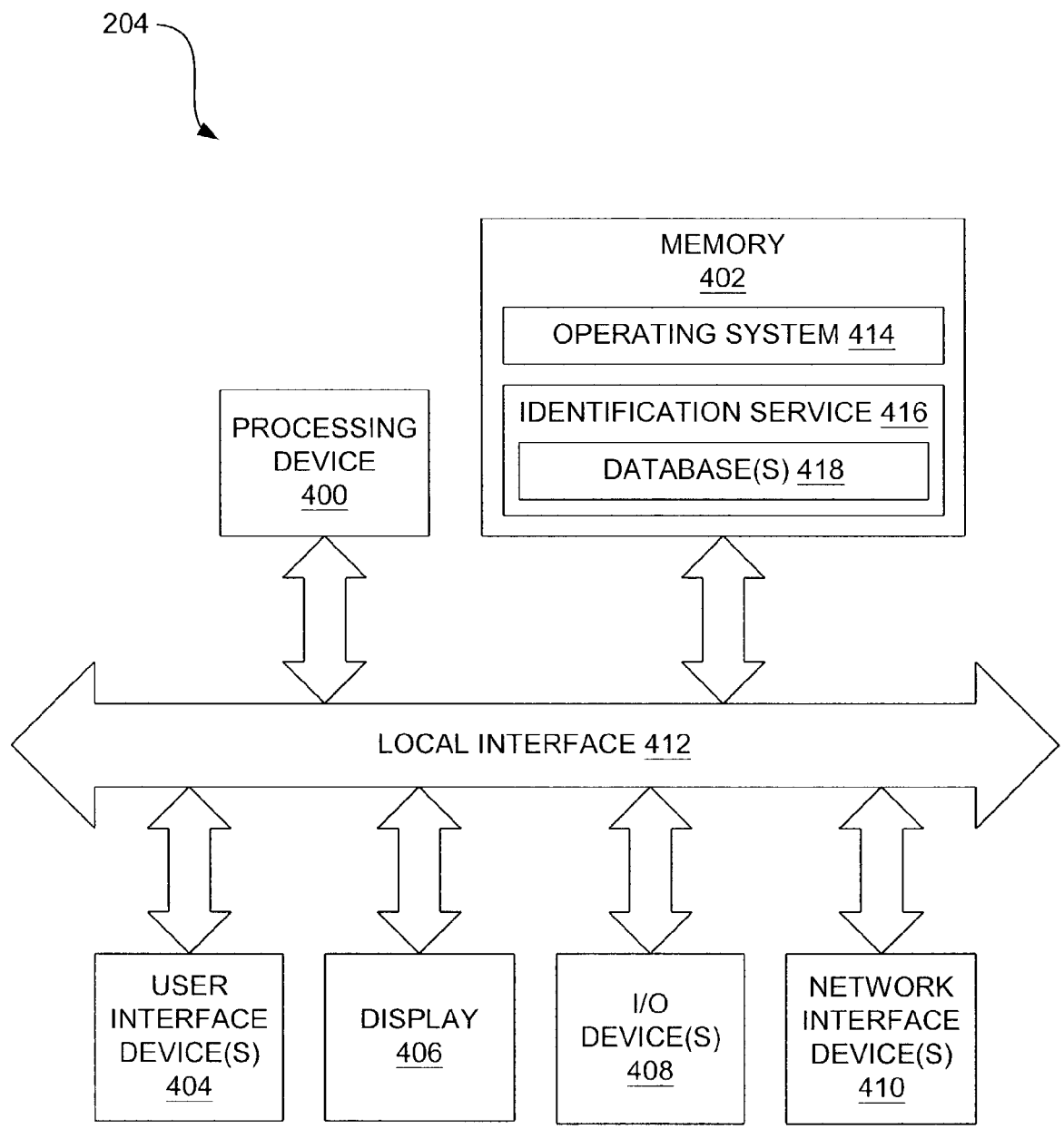
FIG. 4 is a block diagram of an example configuration for a computing device shown in FIG. 2.

FIG. 4 is a block diagram of an example arrangement for one or more of the computing devices 204 shown in FIG. 2. As indicated in FIG. 4, each computing device 204 can, for instance, comprise a processing device 400, memory 402, one or more user interface devices 404, a display 406, one or more I/O devices 408, and one or more network interface devices 410, each of which is connected to a local interface 412. The processing device 400 can include any custom made or commercially available processor, a central processing unit (CPU) or an auxiliary processor among several processors associated with the computing device 204, a semiconductor based microprocessor (in the form of a microchip), or a macroprocessor. The memory 402 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 404 comprise the components with which the user can interact with the computing device 204. Where the computing device 204 comprises a PC or similar device, these components can comprise those typically used in conjunction with a PC such as a keyboard and mouse. The display 406 can comprise a display typically used in conjunction with a PC such as a computer monitor or liquid crystal display (LCD) screen. Finally, the I/O devices 408 and network interface devices 410 can operate and have configurations similar to like-named components identified above with reference to FIG. 3.

Figure 7:
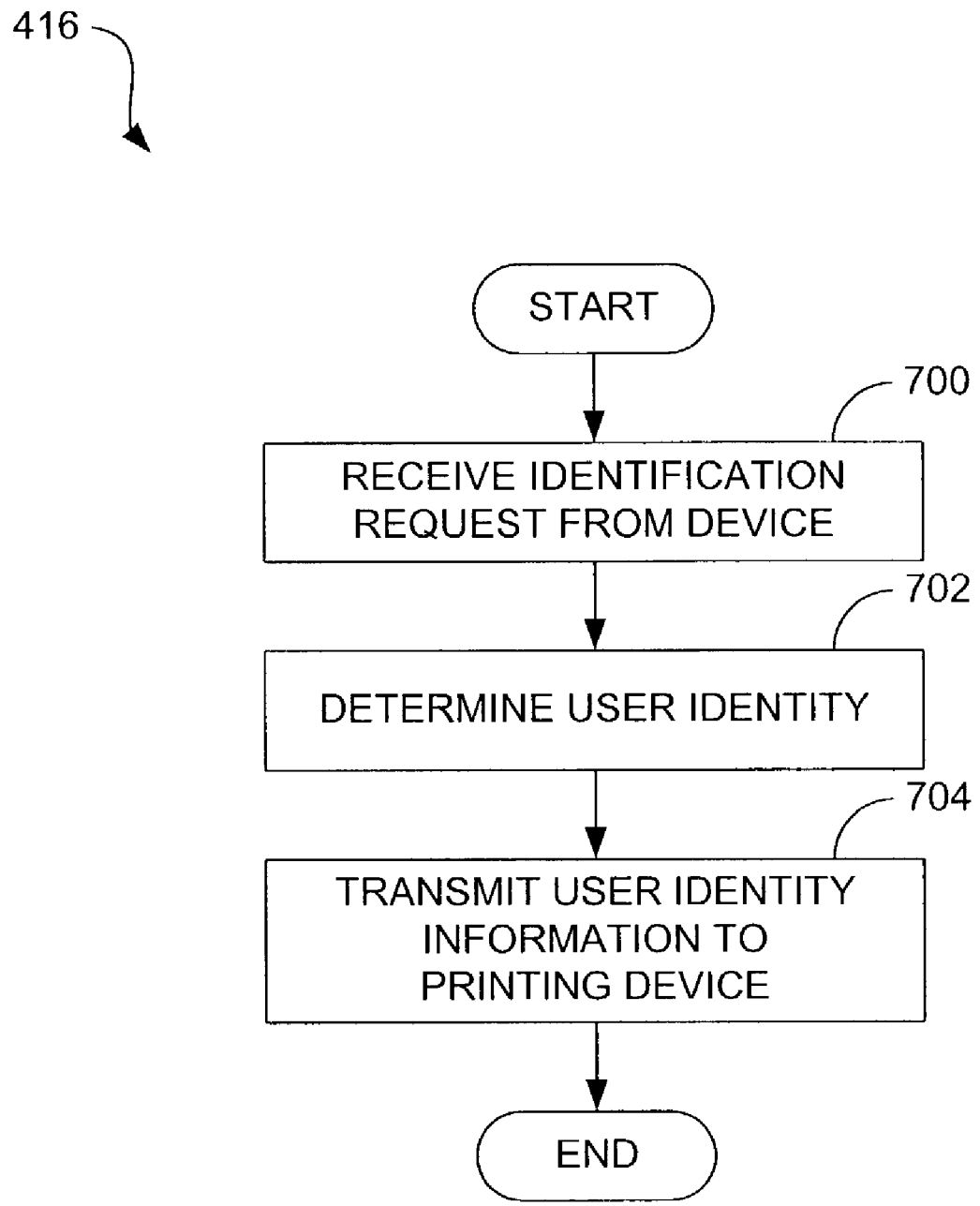
FIG. 7 is a flow diagram that illustrates an example of operation of an identification service of the computing device shown in FIG. 4.

The memory 402 normally comprises various programs in software and/or firmware including an operating system 414 and an identification service 416. The operating system 414 controls the execution of other software/firmware and provides scheduling, input-output control, file and data management, memory management, and communication control and related services. The identification service 416 is used, where necessary, to determine the identity of a user whose proximity is detected by the printing device 202. As indicated in FIG. 4, the identification service 416, where provided, typically includes one or more databases 418 that are referenced during the identification determination. An example of operation of the identification service is provided in relation to FIG. 7 below.

Various code has been identified above. It is to be understood that this code can be stored on any computer-readable medium for use by or in connection with any computer-related system or method. In the context of this document, a computer-readable medium is an electronic, magnetic, optical, or other physical device or means that can contain or store code (e.g., in the form of a computer program) for use by or in connection with a computer-related system or method. The code can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The term "computer-readable medium" can be any means that can store, communicate, propagate, or transport the code for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable media include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

Example systems having been described above, examples of operation of the systems will now be discussed. In the discussions that follow, flow diagrams are provided. It is to be understood that any process steps or blocks in these flow diagrams may represent modules, segments, or portions of code that include one or more executable instructions for implementing specific logical functions or steps in the process. It will be appreciated that, although particular example steps are described, alternative implementations are feasible. Moreover, steps may be executed out of order from that shown or discussed, including substantially concurrently or in reverse order, depending on the functionality involved.

As noted above, shared printing device arrangements can be problematic, especially where many different users print to the same device. Specifically, it can be frustrating for a user when he or she must wait an undue amount of time to receive a print job due to other print jobs that are ahead of the user's print job in the print queue. In that existing solutions to the problem are inadequate, other solutions are needed with which the user can more quickly receive his or her print job. The above-described systems can facilitate this goal by adjusting the print queue such that the user's print job is given greater priority in the queue to thereby reduce wait time.

Figure 5:
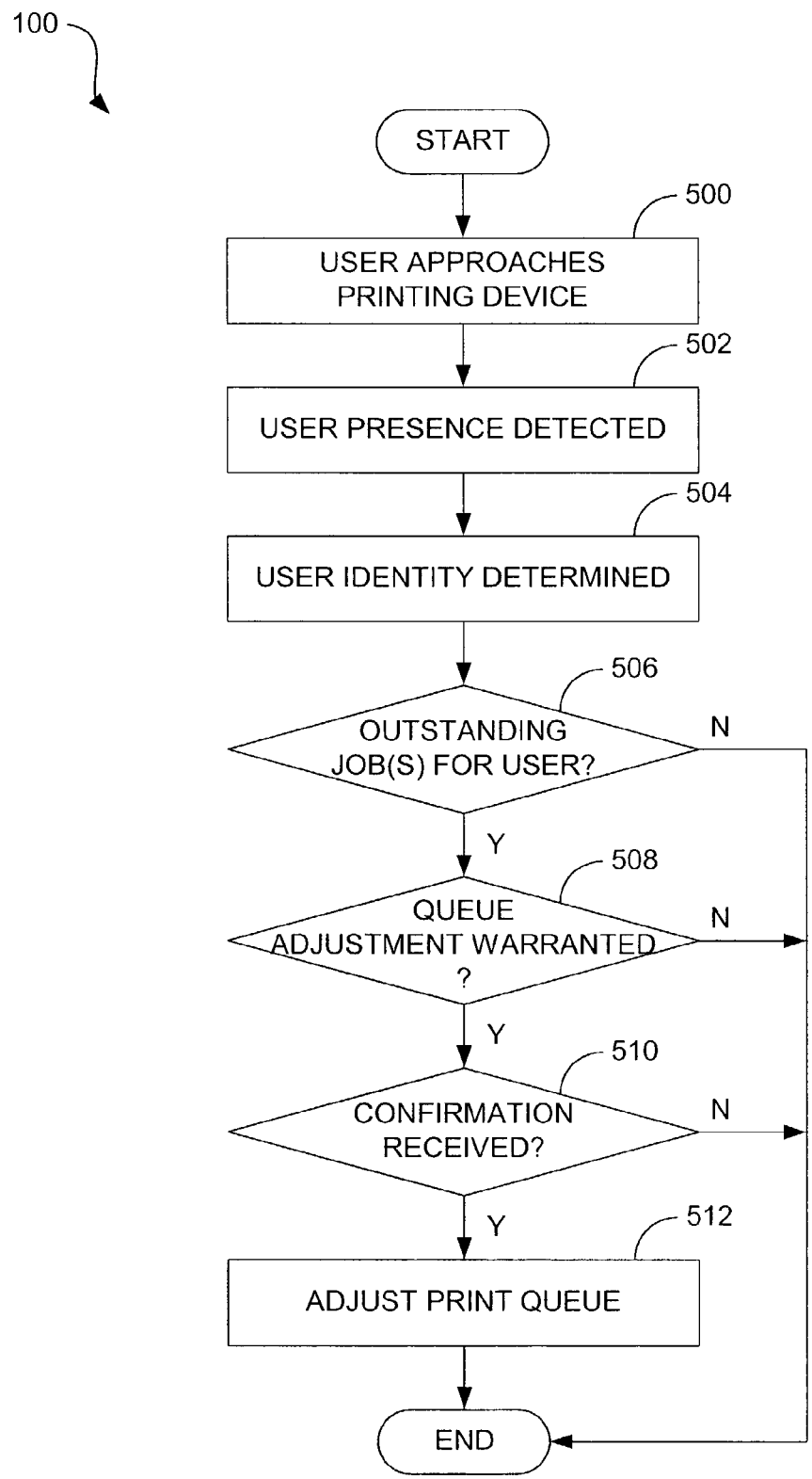
FIG. 5 is a flow diagram that illustrates an example of operation of the system shown in FIGS. 1 and/or 2 in facilitating print queue adjustment.

FIG. 5 provides an example overview of how the above-described systems can be used to facilitate print queue adjustment. Beginning with block 500 of this figure, the user first approaches the printing device. Next, the printing device detects the presence of the user, as indicated in block 502. As is described in greater detail with regard to FIG. 6A below, the manner in which such detection occurs may vary depending upon the particular configuration of the system. Therefore, detection may occur automatically due to mere proximity of the user, or may occur in response to some affirmative action taken by the user. In any case, once the user's presence has been detected, the user's identity can be determined, as indicated in block 504. The manner in which the user identity determination is made also depends upon the particular configuration of the system and, more particularly, upon the capabilities of the printing device. In situations in which the printing device includes its own user identification module (such as module 320 in FIG. 3), the determination can be made locally by the printing device. On the other hand, in situations in which the printing device exports the identification determination duties, a separate computing device (such as a device 204) can be used for this purpose.

After the user's identity has been determined, the printing device determines whether there are any outstanding print jobs for that user, as indicated in decision block 506. This task typically comprises determining whether there are any outstanding print jobs for the user that have been sent to that particular printing device. Alternatively, however, this determination can further include determining whether there are any outstanding print jobs for the user that have been sent to one or more other printing devices. In the latter situation, the outstanding print jobs sent to remote printing devices can be rerouted to the proximate printing device for the convenience of the user.

If there are no outstanding print jobs, no queue adjustment is necessary for the detected user and flow for the adjustment session is terminated. If, on the other hand, there is an outstanding print job, the printing device can determine, as indicated in decision block 508, whether queue adjustment is warranted. As is described in greater detail below, this determination can be made in view of one or several different criteria. Relevant criteria may include the user's authorization, the size of a current job that is printing for another, the number of print jobs in the queue before the user's print job, etc.

If print queue adjustment is not warranted, flow is terminated. However, if adjustment is warranted, flow may continue to decision block 510 at which it is determined whether confirmation for the print queue adjustment has been received. Although such confirmation is an optional feature of the process, requiring such confirmation may avoid undesired results that may occur when, for instance, the print queue is automatically adjusted for a user who merely walks by the printing device, even though the user had no intention of receiving his or her print job more quickly. Where confirmation is required, flow is terminated if it is not received. If it is received, for instance in the form of some entry made by the user into the user interface devices of the printing device, flow continues to block 512 at which the print queue is adjusted.

The nature of the queue adjustment may vary depending upon the configuration of the printing device as well as the current printing conditions. Adjustment may comprise, for instance, temporarily interrupting a currently print job, especially where the current print job is particularly large, adjusting the order of the print jobs so that the user's job is next, elevating the user's print job in the order so that, although not next, the user's print job will be printed earlier than it would have been if adjustment had not occurred, rerouting a print job sent to another printing device to the proximate printing device, and the like. Persons having ordinary skill in the art will appreciate that myriad other adjustments of these sorts could be made, if desired.

Figure 6A:
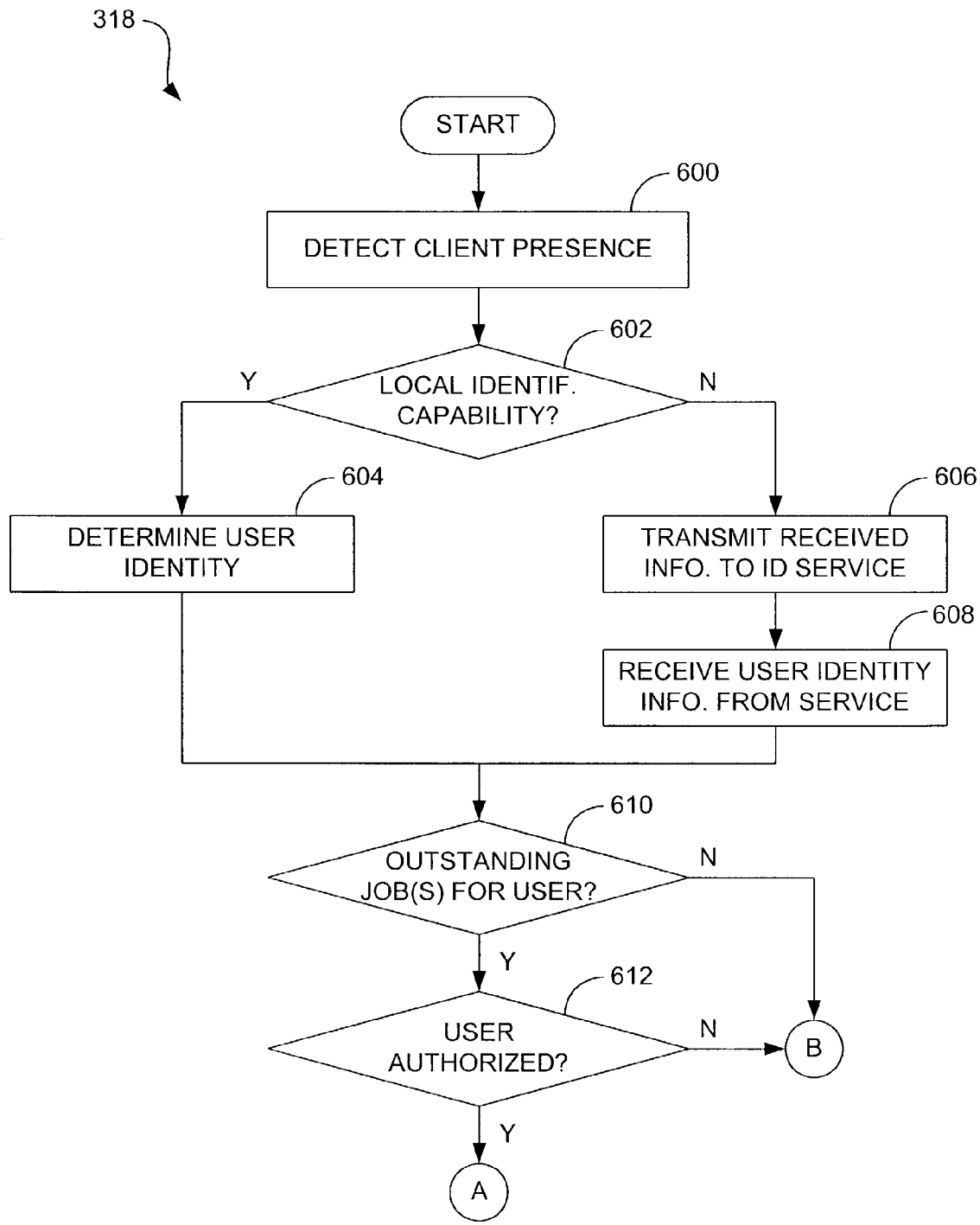
FIGS. 6A and 6B provide a flow diagram that illustrates an example of operation of a print queue controller of the printing device shown in FIG. 3.
Figure 6B:
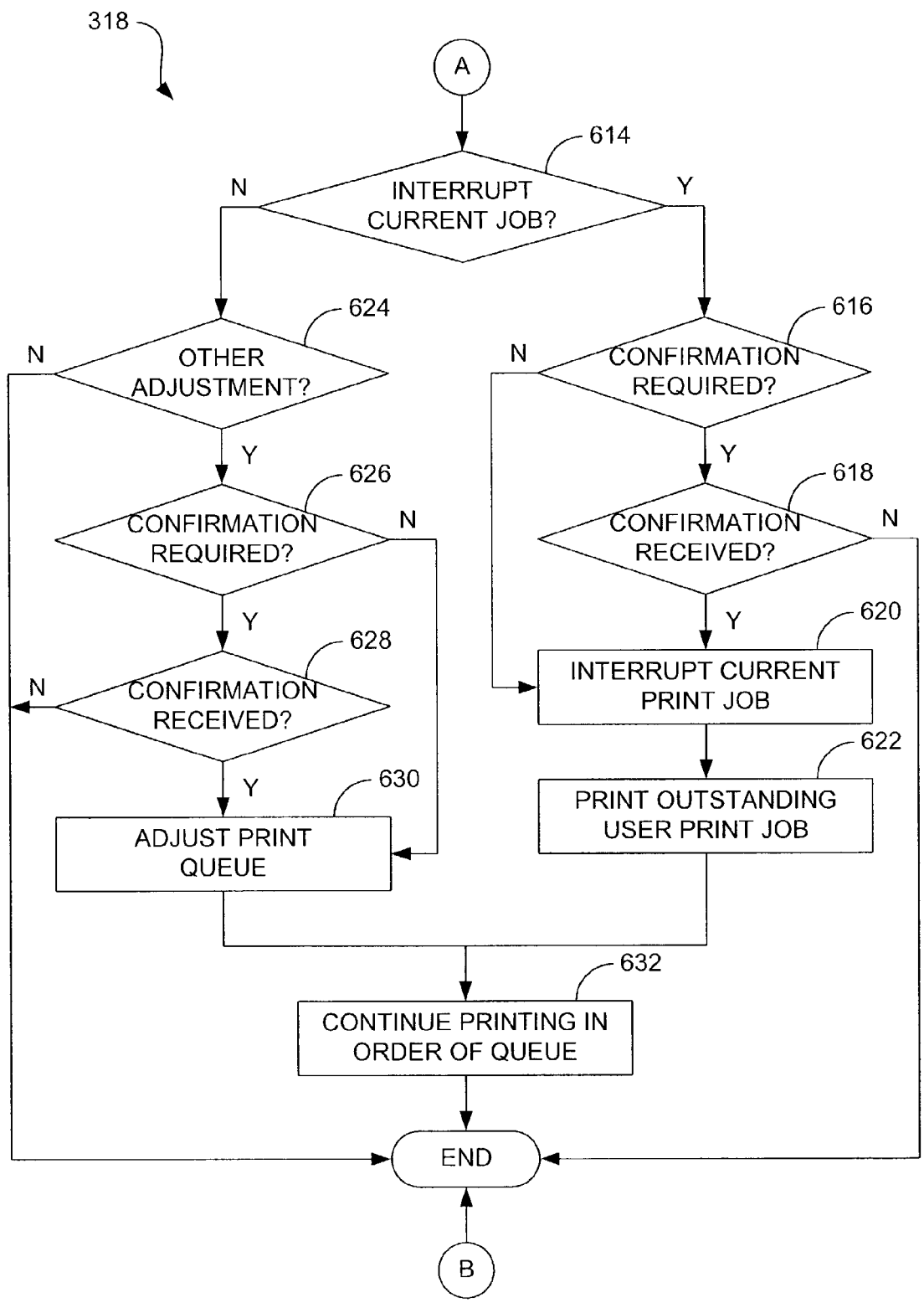

Referring next to FIGS. 6A and 6B, illustrated is an example of operation of the print queue controller 318 of the-printing device 202 shown in FIG. 2. As noted above, although this print queue controller 318 (and the print queue 324) is shown as residing in printing device memory 302, it is to be understood that the print queue controller, in whole or in part, can reside elsewhere (e.g., on a computing device 204) and provide the same functionality that is described in the following. In such a case, the printing device 202 may offload one or more of the responsibilities of the print queue controller 318 to another device that comprises the relevant portions of code that facilitate such functionality. For purposes of discussion, however, it is assumed that at least a portion of the print queue controller 318 resides within the printing device 202 as indicated in FIG. 3.

Beginning with block 600 of FIG. 6A, the print queue controller 318 detects the presence of a client. As described above, the client can comprise a user and/or a client device that is configured to communicate with the printing device 202 and, more particularly, a client communication device 308, in some manner. In one arrangement, detection can occur automatically upon proximity of the client. In such an arrangement, the client communication device 308 may comprise an RF transceiver and detection may comprise detecting an RFID of the user that, for instance, is worn or carried by the user. The range of this detection will depend upon the strength of the RF transceiver and, more particularly, its antenna. To avoid situations in which mere passersby are detected, this range may be intentionally kept small, for instance a few inches to a few feet.

In another arrangement, detection will only occur after some affirmative action is taken on the part of the user. For instance, where the client communication device 308 is some form of scanning device, the action by the user may comprise swiping a card through the scanning device (i.e., card reader) so that one or more of a magnetic strip, barcode, two-dimensional (e.g., dot pattern) code, and written text is read. Where the scanning device is configured to read biometric information, the affirmative action may comprise placing the user's thumb or finger on a print scanner, looking into a retinal scanner, etc. In situations where the client communication device 308 comprises a voice recognition component, the affirmative action may comprise speaking a name and/or password into a microphone of the printing device. In a more simple arrangement, the user may merely cause his or her presence to be "detected" after entering a username and/or password into the printing device using a keyboard or keypad of the printing device.

Irrespective of the manner in which user detection is achieved, it can then be determined whether the print queue controller 318 has local user identification capabilities, as indicated in decision block 602. Specifically, it can be determined whether the printing device is capable of determining, from the information received during user detection who the particular detected user is. Where the printing device has sufficient resources and/or the determination is relatively simple (e.g., looking-up a username/password combination in a database), the identification determination likely is made locally within the printing device. Where, on the other hand, the determination is more complex (e.g., interpreting biometric information), the determination may be offloaded to another device.

If the printing device 202 has the necessary identification capability, flow continues to block 604 at which the print queue controller 318 determines the user identity. As noted above, this step may comprise looking-up user information in one or more databases 322 using the user identification module 320 of the controller 318. If the capabilities are lacking, however, flow continues to block 606 at which the information received through the detection process is transmitted to an appropriate identification service. This identification service may comprise, for example, service 416 of one of the computing devices 204. An example of operation of this service 416 is described with relation to FIG. 7. As indicated in this figure, the service 416 first receives the identification request from the printing device, as indicated in block 700. Next, the service 416 determines the user identity, as indicated in block 702. This step may entail referencing one or more databases 418 of the identification service 416. Once the identification determination has been made by the service 418, the service transmits user identity information to the printing device, as indicated in block 704. Notably, this identity information may comprise information as to the user's authorization or entitlement for print queue adjustment, where the print queue adjustment determination is dependent upon such parameters.

With reference back to block 608 of FIG. 6A, the user identity information is then received by the print queue controller 318 and it is determined whether there are any outstanding print jobs for the identified user, as indicated in decision block 610. If not, flow for the session is terminated (see FIG. 6B). If there are one or more print jobs for the identified user, however, flow continues to decision element 612 at which it is determined whether the user is authorized to receive the benefit of print queue adjustment. Although this step is optional, it may be useful in that print queue adjustment could be disruptive to other print jobs and, therefore, could potentially create frustration for other users. Where the privilege determination is to be made and is made in the negative, flow is terminated. If, however, the user is authorized for print queue adjustment, flow continues on to decision block 614 of FIG. 6B.

At block 614, it is determined whether interruption of the current print job is warranted. This determination may be made based upon several different criteria. In one example, the determination to interrupt a currently printing job may be made if there is a large number of pages that still remain to be printed. In another example, interruption may be warranted where the user's print job was sent with high priority. In a further example, the interruption determination may be made in relation to the identity of the user. Irrespective upon the criteria used to make the interruption determination, if interruption is warranted, flow continues to decision block 616 at which it is determined whether confirmation is required. If not, flow continues down to block 620 described below. If confirmation is required, flow continues to decision block 618 at which it is determined whether confirmation is received. Examples of the nature of this confirmation have been discussed above in relation to FIG. 5. Although this confirmation normally comes from the user, it is to be appreciated that it could be provided by another (e.g., network administrator, group supervisor, etc.), if desired, and may be interactive or automated.

If confirmation is required and is received, or if confirmation was never required, the current print job is interrupted, as indicated in block 620, and the outstanding print job of the user is printed, as indicated in block 622. Again, this print job could have been originally sent to the proximate printing device or to another printing device where the print queue controller is aware of the queues of other printing devices. To simplify the task of distinguishing the user's print job from the previously printing job, the user's print job may, optionally, be output to a separate (e.g., auxiliary) output tray where the printing device comprises more than one output tray or preceded/followed by separator pages.

Referring back to decision block 614, if interruption of the currently printing job is not warranted, it is determined, as indicated in block 624, whether other print queue adjustment is warranted. As described above, other adjustment may comprise, for instance, elevating the user's print job up in the order of the queue. If no such adjustment is warranted, flow is terminated. If, on the other hand, a print queue adjustment other than job interruption is warranted, flow continues to decision block 626 at which it is determined whether confirmation is required. If not, flow continues down to block 630 described below. If confirmation is required, flow continues to decision block 628 at which it is determined whether confirmation is received. If confirmation is not received, flow is terminated. If confirmation is received, or if it was not necessary, the print queue is adjusted, as indicated in block 630.

Once the adjustment occurs, whether it be job interruption, job elevation, or another form of adjustment, the printing device, under the control of the print queue controller 318, continues printing jobs in the order of the print queue, as indicated in block 632. Where a previously printing job was interrupted, this continuation of printing typically will comprise resumption of printing the interrupted job to the output tray that was previously being used.

With the manners of operation described above in relation to FIGS. 5–7, priority can be given to print jobs of those persons that, through their proximity to the printing device, express a desire or need for more rapid print results. Therefore, users with more pressing needs for their print jobs can more quickly receive them, thereby greatly reducing user frustration and increasing printing efficiency.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for printing with a printing device, comprising:
    detecting proximity of a user to the printing device;
    determining if the user has any outstanding print jobs; and
    adjusting a print queue for the printing device if it is determined that the user does have an outstanding print job.

2. The method of claim 1, wherein detecting proximity of a user comprises detecting a client radio frequency identification (RFID) of the user.

3. The method of claim 1, wherein detecting proximity of a user comprises scanning one of a magnetic strip, barcode, two-dimensional code, and written text associated with the user.

4. The method of claim 1, wherein detecting proximity of a user comprises scanning a biometric parameter of the user.

5. The method of claim 1, wherein detecting proximity of a user comprises recognizing a voice of the user.

6. The method of claim 1, wherein detecting proximity of a user comprises receiving a code entered by the user.

7. The method of claim 1, wherein determining if the user has any outstanding print jobs comprises determining if the user has any outstanding print jobs in the queue for the printing device.

8. The method of claim 1, wherein determining if the user has any outstanding print jobs comprises determining if the user has any outstanding print jobs in a queue for another printing device.

9. The method of claim 1, wherein adjusting a print queue comprises interrupting a current print job.

10. The method of claim 1, wherein adjusting a print queue comprises elevating the user's print job in the order of the queue.

11. The method of claim 1, wherein adjusting a print queue comprises adding the user's print job from another queue to the queue for the printing device.

12. The method of claim 1, further comprising determining the identity of the user.

13. The method of claim 12, wherein determining the identity comprises determining the user's identity using an identification module within the printing device.

14. The method of claim 12, wherein determining the identity comprises determining the user's identity using a network-accessible identification service.

15. The method of claim 1, further comprising printing the user's print job.

16. The method of claim 15, wherein printing the user's print job comprises outputting the user' print job to an auxiliary tray of the printing device.

17. A system for printing, comprising:
means for detecting proximity of a user to a printing device;
means for determining if the user has any outstanding print jobs; and
means for adjusting a print queue for the printing device if it is determined that the user does have an outstanding print job.

18. The system of claim 17, wherein the means for detecting proximity of a user comprise a radio frequency transceiver.

19. The system of claim 17, wherein the means for detecting proximity of a user comprise a scanning device that is configured to scan at least one of a magnetic strip, barcode, two-dimensional code, written text, an a biometric parameter of the user.

20. The system of claim 17, wherein the means for detecting proximity of a user comprise means for recognizing the user's voice.

21. The system of claim 17, wherein the means for detecting proximity of a user comprise a keyboard that is configured to receive a user-entered code.

22. The system of claim 17, wherein the means for adjusting a print queue comprise means for interrupting a current print job.

23. The system of claim 17, wherein the means for adjusting a print queue comprise means for elevating the user's print job in the order of the queue.

24. The system of claim 17, wherein the means for adjusting a print queue comprise means for adding the user's print job from another queue to the queue for the printing device.

25. The system of claim 17, further comprising means for determining the identity of the user.

26. A computer-readable medium that stores a print queque controller, the print queue controller comprising:
logic configured to detect the presence of a user to a printing device;
logic configured to determine if the user has any outstanding print jobs; and
logic configured to adjust a print queue for the printing device if it is determined that the user does have an outstanding print job.

27. The computer-readable medium of claim 26, wherein the logic configured to adjust a print queue comprises logic configured to interrupt a print job.

28. The computer-readable medium of claim 26, wherein the logic configured to adjust a print queue comprises logic configured to elevate the user's print job in the queue.

29. The computer-readable of claim 26, wherein the logic configured to adjust a print queue comprises logic configured to add the user's print job to the queue.

30. The computer-readable medium of claim 26, wherein the controller further comprises logic configured to determine the identity of the user.

31. A computer-readable medium that stores a print queue controller, the print queue controller comprising:
logic configured to detect the presence of a user;
logic configured to facilitate determination of the user's identity;
logic configured to determine if there are any outstanding print jobs for the user; and
logic configured to adjust the print queue for the printing device in a manner such that the user's print job is printed sooner.

32. A printing device, comprising:
a processor;
a print engine;
a client communication device; and
memory comprising a print queue controller, the controller comprising logic configured to detect the presence of a user, logic configured to facilitate determination of the user's identity, logic configured to determine if there are any outstanding print jobs for the user, and logic configured to adjust the print queue for the printing device in a manner such that the user's print job is printed sooner.

* * * * *

UNITED STATES PATENT AND TRADEMARK OFFICE
CERTIFICATE OF CORRECTION

PATENT NO. : 7,187,462 B2 Page 1 of 1
APPLICATION NO. : 10/188431
DATED : March 6, 2007
INVENTOR(S) : Kenneth Lee Oakeson et al.

It is certified that error appears in the above-identified patent and that said Letters Patent is hereby corrected as shown below:

In column 11, line 2, in Claim 16, delete "user'" and insert -- user's --, therefor.

In column 11, line 18, in Claim 19, delete "an" and insert -- and --, therefor.

In column 11, line 39, in Claim 26, delete "queque" and insert -- queue --, therefor.

In column 12, line 12, in Claim 29, after "computer-readable" insert -- medium --.

Signed and Sealed this

Fourth Day of August, 2009

JOHN DOLL
*Acting Director of the United States Patent and Trademark Office*